United States Patent [19]

Gill et al.

[11] Patent Number: 5,776,242
[45] Date of Patent: Jul. 7, 1998

[54] SILICATE-DEXTRIN CLAY ADHESIVE COMPOSITIONS

[75] Inventors: Petra Gill, Warminster, Pa.; Michael J. McDonald, Toronto, Canada; Judith L. Thompson, Harleysville, Pa.

[73] Assignee: PQ Corporation, Valley Forge, Pa.

[21] Appl. No.: 743,117

[22] Filed: Nov. 4, 1996

Related U.S. Application Data

[63] Continuation-in-part of Ser. No. 607,905, Feb. 28, 1996, Pat. No. 5,571,316.

[51] Int. Cl.$^6$ .................................................. C09J 103/02
[52] U.S. Cl. ............... 106/617; 106/205.3; 106/205.31; 106/205.9; 106/211.1; 106/215.1; 106/217.3; 106/217.7; 106/217.9; 106/287.1; 106/628; 106/632
[58] Field of Search ................. 106/617, 205.3, 106/205.31, 205.9, 628, 632, 287.1, 211.1, 215.1, 217.3, 217.7, 217.9

[56] References Cited

U.S. PATENT DOCUMENTS

| 2,087,836 | 4/1937 | Carter | 106/617 |
| 3,433,691 | 3/1969 | Reese | 106/617 |
| 3,767,440 | 10/1973 | Olix | 106/617 |
| 4,066,463 | 1/1978 | Chollet | 106/617 |
| 4,437,893 | 3/1984 | Krinski et al. | 106/617 |
| 4,828,616 | 5/1989 | Yamasoe | 106/617 |
| 5,571,316 | 11/1996 | Gill | 106/617 |

FOREIGN PATENT DOCUMENTS

| 1268127 | 3/1972 | United Kingdom | 106/617 |

*Primary Examiner*—Anthony Green
*Attorney, Agent, or Firm*—Ernest G. Posner

[57] ABSTRACT

Disclosed are silicate-dextrin-clay adhesive compositions and process for making the same for use in paper products, such as, paper tubes, corrugated boards and corner boards.

11 Claims, No Drawings

SILICATE-DEXTRIN CLAY ADHESIVE COMPOSITIONS

This application is a continuation-in-part of application Ser. No. 08/607,905, filed on Feb. 28, 1996 now U.S. Pat. No. 5,571,316.

BACKGROUND OF THE INVENTION

1. Field of the Invention

The present invention relates to silicate-dextrin adhesive compositions, silicate-dextrin-clay compositions and process for producing the same.

2. Reported Developments

Aqueous alkali metal silicates, particularly sodium silicates, are very old in the art and have many technical applications including their use as binders in coatings and as adhesives for solid fiber and corrugated boxes and cartons and plywood manufacture. They are versatile adhesives, combining convenience for use with strength and rigidity. However, in their use in the manufacture of paper products, such as paper tubes, they do not provide sufficient initial tack and may cause breakdown of the manufacturing process.

Dextrin and modified dextrins have also been used as adhesives for various applications, including many uses in the paper industry. While these adhesives quickly develop initial tack, they are difficult to clean from the processing machinery. They also do not have the strength and rigidity which the silicate-type adhesives have and their use is rather limited in the paper industry where strength and rigidity is required.

In order to provide the desirable characteristics of quick initial tack, rigidity and strength in adhesives intended for use in the paper industry, aqueous alkali silicates were combined with dextrin, as in U.S. Pat. No. 3,433,691. In so doing, the prior art has found that at least about one percent of dextrin is required to improve the initial tack quality over that obtained with straight silicate adhesives. While the initial tack requirement could be improved with the addition of more than one percent dextrin, thereby enabling a fast, automatic process in the manufacture of paper laminates, another problem arose. When the composition contained more than about 0.5 percent dextrin, the dextrin "floated out", rising to the surface of the adhesive composition. This floating out was observed both at the time of application of the adhesive to paper products and on storage of the adhesive. The floating out has resulted in faulty paper products and clogging of the complex dispensing apparatus.

U.S. Pat. No. 3,767,440 report that the floating out problem has been overcome by the addition to the aqueous alkali metal silicate/dextrin adhesive composition of a clay slurry consisting of a swelling type clay and a kaolin type clay. The addition of the clay slurry renders the adhesive composition thixotropic and prevents floating out of the dextrin from the adhesive composition.

The prior art also addresses the need of flame-resistant adhesive compositions, such as disclosed in U.S. Pat. No. 4,066,463, which discloses the combination of asbestos fibers with alkali metal silicate, starch, carboxymethylcellulose and dextrin.

Other references are directed to the use of vegetable proteins in silicate containing adhesives, such as: U.S. Pat. Nos. 2,457,108 and 2,681,290. These adhesives require heat on application to the surfaces to be joined and to form the necessary bond between the surfaces. Still other references disclose the use of cellulosic material, such as wood pulp to control viscosity, for example, U.S. Pat. No. 3,241,990, or soy polysaccharides, for example, U.S. Pat. No. 4,437,893 in combination with alkali metal silicates.

One object of the present invention is to provide a silicate-dextrin based adhesive composition having superior initial tack, adhesive strength and other desirable characteristics heretofore not quite satisfactorily provided for use in the paper industry including but not limited to tube winding, corrugated and corner boards.

Another object of the present invention is to provide a silicate-dextrin-clay based adhesive composition having increased penetration into paper and set time, increased shelf life and other desirable characteristics for use in the paper industry.

SUMMARY OF THE INVENTION

The present invention consists of two embodiments: embodiment I which relates to a silicate-dextrin based adhesive composition and process of producing the same; and embodiment II which relates to a silicate-dextrin-clay based adhesive composition and process of producing the same.

The adhesive composition of embodiment I of the present invention comprises a mixture of:

(a) from about 0.05 to about 0.50% w/w, and preferably about 0.20% w/w of sodium metasilicate;

(b) from about 10 to about 47% w/w, and preferably about 21% w/w of dextrin;

(c) from about 17 to about 70% w/w, and preferably about 58% w/w of an alkali metal silicate, preferably sodium silicate;

(d) from about 0.05 to about 0.50% w/w of sodium metaborate octahydrate or sodium metaborate tetrahydrate; and (e) from about 18.0 to about 62.0% w/w, and preferably about 21% w/w of water.

The adhesive composition of embodiment I of the present invention is prepared by the following steps the order of which is critical:

(1) adding of from about 0.05 to about 0.50% w/w of sodium metasilicate to of from about 18.0 to about 62.0% w/w water, while vigorously stirring, to obtain a solution of the sodium metasilicate;

(2) adding with continuous stirring of from about 10 to about 47% w/w dextrin to obtain a solution of sodium metasilicate/dextrin;

(3) adding with continuous stirring of from about 17 to about 70% w/w of an alkali metal silicate, preferably sodium silicate, to obtain a solution of sodium metasilicate/dextrin/alkali metal silicate; and (4) adding with continuous stirring of from about 0.05 to about 0.50% w/w of sodium metaborate octahydrate.

The adhesive composition so prepared may be stored at any temperature, including temperatures below freezing, as long as the temperature is maintained below 38° C.

The adhesive composition of embodiment II of the present invention comprises a mixture of:

(a) from about 0.05 to about 0.50% w/w, and preferably about 0.20% w/w of sodium metasilicate;

(b) from about 0 to about 50% w/w, and preferably from about 10 to about 20% w/w of dextrin;

(c) from about 3.0 to about 50% w/w, and preferably about 10 to about 20% w/w of an inert clay, preferably kaolin clay;

(d) from about 17 to about 70% w/w, and preferably about 40 to about 60% w/w of an alkali metal silicate, preferably sodium silicate;

(e) from about 0.05 to about 0.50%, and preferably 0.20% w/w w/w of sodium metaborate octahydrate or sodium metaborate tetrahydrate;

(f) from about 0.1 to about 10% w/w, and preferably about 1.0 to 2.0% w/w of 50% w/w sodium hydroxide or potassium hydroxide;

(g) from about 0 to 1% w/w, and preferably about 0.05 to 0.10% w/w of a wetting agent;

(h) from about 0.1 to about 10% w/w, and preferably about 3 to 5% w/w of an alcohol which includes methanol, ethanol, polyvinyl alcohol, or polyvinyl acetate;

(i) from about 0.1 to about 30% w/w, and preferably about 5 to 10% w/w of a sugar; and (j) from about 15 to about 62% w/w and preferably about 15 to 21% w/w of water.

In the composition the inert clay may be at least partially replaced by a starch, such as corn starch.

The adhesive composition of embodiment II of the present invention is prepared by the following steps:

(1) adding from about 0.05 to about 0.50% w/w of sodium metasilicate to about 15 to 62.0% w/w water, while vigorously stirring, to obtain a solution of the sodium metasilicate;

(2) adding with continuous stirring from about 0 to 50% w/w of dextrin to obtain a solution of sodium metasilicate/dextrin;

(3) adding with continuous stirring, from about 17 to about 70% w/w of an alkali metal silicate, preferably sodium silicate, to obtain a solution of sodium metasilicate/dextrin/alkali metal silicate;

(4) adding, with continuous stirring, from about 0.05 to 0.50% w/w of sodium metaborate octahydrate or sodium metaborate tetrahydrate to obtain a uniform blend thereof;

(5) adding with stirring about 3 to about 50% w/w of an inert clay, preferably kaolin to obtain a uniform blend thereof;

(6) optionally heating the blend of ingredients at about 80° C. to 90° C. for a period of about 15 to 20 minutes;

(7) cooling the blend of ingredients to about 25° C.;

(8) adding, with stirring, 0.1 to 10% w/w, and preferably about 1 to 2% w/w of 50% w/w sodium hydroxide or potassium hydroxide;

(9) adding, with stirring, about 0 to 1% w/w of a wetting agent;

(10) adding, with stirring, about 0.1 to 10% w/w of an alcohol; and

(11) adding about 0.1 to 30% w/w sugar and stirring until a homogeneous blend of the mixture is obtained.

We have also observed that the inert clay may be replaced with starch.

While in the process of preparing the adhesive composition of the present invention the heating step improves certain properties of the composition, an excellent composition is still obtained without using the heating step.

DETAILED DESCRIPTION OF THE INVENTION

The ingredients used in the embodiments I and II of the present invention are readily available commercially and may also be prepared by methods known in the art.

Sodium metasilicate is well-known and used commercially and is described, for example by Faith, Keyes & Clark's Industrial Chemicals, F. A. Lowenheim, M. K. Moran, Eds. Wiley-Interscience, New York, 4th Edition, 1975, pp. 755–761.

Sodium silicate in dry form of $Na_2 SiO_3$, $Na_6 Si_2O_7$ and $Na_2 Si_3O_7$ having a 2.0 to 5.5 ratio of $SiO_2$ to $Na_2O$ is preferred for use in the adhesive compositions of the present invention. However, sodium silicate solutions may also be used in which case, the water content of the solution should be considered so that the above-identified composition ranges are satisfied.

Typical commercial alkali metal silicates are shown in Table I.

TABLE I

| Alkali Metal | Wt. Ratio $SiO_2:M_2O$ | $SiO_2$ (%) | $Na_2O$ (%) | Density (lb/gal) | Viscosity (centipoise) |
|---|---|---|---|---|---|
| Sodium | 3.75 | 25.3 | 6.75 | 11.0 | 220 |
|  | 3.25 | 29.9 | 9.22 | 11.8 | 830 |
|  | 3.25 | 28.4 | 8.7 | 11.6 | 160 |
|  | 3.22 | 27.7 | 8.6 | 11.5 | 100 |
|  | 2.87 | 32.0 | 11.1 | 12.4 | 1,250 |
|  | 2.58 | 32.1 | 12.5 | 12.6 | 780 |
|  | 2.50 | 26.5 | 10.6 | 11.7 | 60 |
|  | 2.40 | 33.2 | 13.85 | 13.0 | 2,100 |
|  | 2.20 | 29.2 | 13.3 | 12.5 | — |
|  | 2.00 | 29.4 | 14.7 | 12.8 | 400 |
|  | 2.00 | 36.0 | 18.0 | 14.1 | 70,000 |
|  | 1.90 | 28.5 | 15.0 | 12.7 | — |
|  | 1.80 | 24.1 | 13.4 | 12.0 | 60 |
|  | 1.60 | 31.5 | 19.7 | 14.0 | 7,000 |
| Potassium | 2.50 | 20.8 | 8.3 | 10.5 | 40 |
|  | 2.20 | 19.9 | 9.05 | 10.5 | 7 |
|  | 2.10 | 26.3 | 12.5 | 11.5 | 1,050 |

Sodium metaborate octahydrate is also available commercially and is made by fusing borax and sodium carbonate.

Dextrin is available in various forms such as canary yellow and white dextrin and is produced by the dry heating of unmodified starches. It is preferred to use white dextrin for certain paper end products, and the highly soluble linear dextrin sold under the tradename AMAIZO1752-S DEXTRIN, AMAIZO1895 and Casco "Multi-Dextrin"sold by American Maize-Products Co., Hammond, Ind. Other useful dextrins include:

a) hydrolyzed starch (i.e., dextrin), Amaizo 1407 Dextrin (American Maize-Products Co.)

b) medium-low viscosity yellow or canary corn dextrin, Amaizo 1740 Dextrin (American Maize-Products Co.)

c) corn-based dextrin 23 to 30 percent soluble in cold water, Stadex® 27 (A. E. Staley Mfg. Co., Decatur, Ill.)

d) corn-based dextrin 38 to 53 percent soluble in cold water, Stadex® 50 (A. E. Staley Mfg. Co.) and e) corn-based dextrin 75 to 90 percent soluble in cold water, Stadex® 140 (A. E. Staley Mfg. Co.).

Surfactants or wetting agents used in the present invention are anionic surfactants the pH of which is about 11 or higher. Such surfactants include the soaps of fatty acids, alkyl sulfates and alkyl sulfonates which are described in detail in the Handbook of Pharmaceutical Excipients published jointly by the American Pharmaceutical Association and the Pharmaceutical Society of Great Britain, The Pharmaceutical Press, 1986.

Preferred surfactants used in the present invention include:

Dow Fax 2A1 made by Dow Chemical Co.;

Glucopon 425N and Glucopon 220 made by Henkel Chemical Co.; and

Niaproof 08 made by Niacet Chemical Co.

The preferred sugar used in the present invention is sucrose.

The following examples will demonstrate by way of illustration some of the preferred adhesive compositions of embodiment I of the present invention, and the process of their preparation. The sodium metasilicate in the amount of from 0.05 to about 0.50% w/w must be added and dissolved in water prior to the addition of dextrin.

EXAMPLE 1

0.5 grams of sodium metasilicate is dissolved in 35 grams of water followed by the addition of 65 grams of Dextrin with stirring. 23.08 grams of the mix is added to 76.92 grams of silicate and mixed with stirring until the mixture becomes homogeneous. 0.30 grams of sodium metaborate octahydrate is then added and mixed well with the homogeneous mixture at room temperature.

EXAMPLE 2

0.08 grams of sodium metasilicate is dissolved in 35 grams of water followed by the addition of 65 grams of Dextrin with stirring. 34.64 grams of this mix is added to a mixture of 57.69 sodium silicate, 0.30 grams of sodium metaborate tetrahydrate and 7.39 grams of water. The combined mixtures are then mixed at room temperature to homogeneity.

EXAMPLE 3

0.10 grams of sodium metasilicate is dissolved in 35 grams of water followed by the addition of 65 grams of Dextrin with stirring. 46.15 grams of this mix is added to 38.36 grams of potassium silicate, 0.35 grams of sodium metaborate octahydrate and 15.03 grams of water. The ingredients are mixed at room temperature until the mixture becomes homogeneous.

EXAMPLE 4

0.20 grams of sodium metasilicate is dissolved in 35 grams of water followed by the addition of 65 grams of Dextrin with stirring. 15.38 grams of this mix is added to 51.0 grams of sodium silicate, 0.28 grams of sodium metaborate tetrahydrate and 33.33 grams of water. The ingredients are mixed at room temperature until the mixture becomes homogeneous.

EXAMPLE 5

0.50 grams of sodium metasilicate is dissolved in 35 grams of water followed by the addition of 50 grams of Dextrin with stirring. 30 grams of this mix is added to 70 grams of sodium silicate. The ingredients are mixed at room temperature until the mixture becomes homogeneous.

EXAMPLE 6

0.30 grams of sodium metasilicate is dissolved in 35 grams of water followed by the addition of 20 grams of Dextrin with stirring. 20 grams of this mix is added to 79.70 grams of sodium silicate and 0.30 grams of sodium metaborate octahydrate. The ingredients are mixed at room temperature until the mixture becomes homogeneous.

EXAMPLE 7

0.40 grams of sodium metasilicate is dissolved in 35 grams of water followed by the addition of 20 grams of Dextrin with stirring. 50 grams of this mix is added to 49.70 grams of sodium silicate and 0.30 grams of sodium metaborate octahydrate. The ingredients are mixed at room temperature until the mixture becomes homogeneous.

EXAMPLE 8

To a large container, having a mixer capable of operating at variable speed, are added 15 gallons of water and 1.25 lbs sodium metasilicate. The components are stirred at moderate speed at room temperature until the sodium metasilicate dissolves. 125 lbs of dextrin is then added and the mixture is stirred at slow speed for about 30 minutes followed by the addition of 305 lbs of sodium silicate with stirring for another 10 minutes. 1.3 lbs of sodium metaborate is added while stirring the mixture for an additional 10 minutes.

The adhesive formulations of the present invention are utilized in making paper products, such as paper tubes, corrugated boards and angle boards, comprising layers of paper adhered to each other by the adhesive formulation. The properties of the final product is a function of the paper used, number of layers of the paper and the particular adhesive used. It was found that an adhesive formulation of the present invention having a solid content of from about 30% w/w to about 44% w/w is required to satisfy the various requirements in the final product. Experiments performed using various solid contents in the formulations showed the following viscosities which indicate the operable utility range. Examples 9–14, the preparations of which are analogous to Examples 1–7, show % solid contents and associated viscosities in Table II.

TABLE II

| Example | Viscosity (cps) | % w/w Solids |
| --- | --- | --- |
| 8 | 3400 | 44 |
| 9 | 766 | 41.8 |
| 10 | 368 | 38.4 |
| 11 | 721 | 40.5 |
| 12 | 332 | 37.8 |
| 13 | 220 | 35 |
| 14 | 150 | 33.2 |

Stability testing was performed on samples at 0° C., 5° C., 21° C., 38° C. and 70° C. using IR spectroscopy and visual inspection methods for determining stability. The data obtained is shown in Table III.

TABLE III

Samples at Temperatures °C.

0 = stable for more tan six months
5 = stable for more than six months
21 = stable for more than six months
38 = stable for more than six months
70 = unstable after one hour as shown by IR; visually it is dark brown.

The following examples will demonstrate by way of illustration some of the preferred adhesive compositions of the embodiment II of the present invention and the process of their preparation.

EXAMPLE 15–17

Sodium metasilicate was added to water and mixed at room temperature. Dextrin was added and the mixture was heated to 80° C. for 20 minutes. Sodium metaborate octahydrate was charged into the heated mixture and mixed well. Kaolin clay, sodium silicate and sodium hydroxide were then added and mixed well. The mixture was cooled to 25° C.

To the cooled mixture a wetting agent, alcohol and sugar may be added.

The amount of ingredients expressed in grams, % solids and viscosities are shown in Table IV.

TABLE IV

| Ingredients, % solids and viscosities | Unheated | Heated with 1% NaOH | Heated with 2% NaOH |
|---|---|---|---|
| Metso 2048 (metasilicate) | 0.23 | 0.24 | 0.24 |
| Water | 19.42 | 12.79 | 12.79 |
| Dextrin 1752 | 11.49 | 12.45 | 12.45 |
| Koalin Clay | 11.49 | 12.45 | 12.45 |
| N Silicate | 56.13 | 60.81 | 60.81 |
| Borate | 0.23 | 0.24 | 0.24 |
| Caustic | 0.00 | 1.00 | 2.00 |
| % Solids | 45.0 | 48.4 | 48.4 |
| Viscosity (cps) | 2280.0 | 2320.0 | 1720.0 |

EXAMPLE 18-22

Examples 18 to 22 show compositions from the preparations of which the heating step was omitted. In the examples the order of addition to water is: metasilicate, dextrin or starch, clay, alkali silicate, metaborate, followed by a surfactant, an alcohol, caustic, or a sugar, if desired. After the addition of each ingredient, ingredients were thoroughly mixed. The amount of ingredients in grams and tack time are shown in Table V.

TABLE V

| Ingredients | 4.0 Ratio | 4.5 Ratio | Starch | 25% Clay | 50% Clay |
|---|---|---|---|---|---|
| Metso 2048 (metasilicate) | 3.8 | 3.8 | 3.8 | 3.8 | 3.8 |
| Water | 378 | 378 | 378 | 378 | 378 |
| Dextrin 1752 | 378 | 378 | 0 | 283.5 | 189 |
| Kaolin Clay | 0 | 0 | 0 | 94.5 | 189 |
| N Silicate | 0 | 0 | 923 | 923 | 923 |
| Borate | 3.8 | 3.8 | 3.8 | 3.8 | 3.8 |
| Caustic (NaOH) | 0 | 0 | 0 | 0 | 0 |
| Caustic (KOH) | 0 | 0 | 0 | 0 | 0 |
| Starch | 0 | 0 | 378 | 0 | 0 |
| 4.5 Ratio Silicate | 0 | 923 | 0 | 0 | 0 |
| 4.0 Ratio Silicate | 923 | 0 | 0 | 0 | 0 |
| Surfactant | 0 | 0 | 0 | 0 | 0 |
| Alcohol | 0 | 0 | 0 | 0 | 0 |
| Sugar | 0 | 0 | 0 | 0 | 0 |
| Tack Time (min) | 2.3 | 2.5 | 1.5 | 3.3 | 1.7 |

EXAMPLE 23-27

The samples in these examples were either heated or unheated as specified. The order of addition and the mixing procedure were the same as in Examples 18-22. The amounts of ingredients and viscosities are shown in Table VI.

TABLE VI

| Ingredients | 1501-69 heated | 1685-2-1 heated | Heated w/ Alcohol | Unheated w/Sugar | Unheated scale up |
|---|---|---|---|---|---|
| Metso 2048 (metasilicate) | 0.63 | 1.54 | 1.5 | 1.5 | 18 |
| Water | 62.5 | 149.9 | 150 | 150 | 1090 |
| Dextrin 1752 | 32 | 78.4 | 78 | 78 | 1000 |
| Kaolin Clay | 32 | 78.4 | 78 | 78 | 1000 |
| N Silicate | 152 | 383.1 | 383 | 383 | 4000 |
| Borate | 0.63 | 1.54 | 1.5 | 1.5 | 18 |
| Caustic (NaOH) | 3 | 0 | 1 | 1 | 90 |
| Caustic (KOH) | 0 | 70 | 0 | 0 | 0 |
| Surfactant | 1 | 0 | 0 | 0 | 5 |
| Alcohol | 0 | 0 | 3 | 0 | 0 |
| Sugar | 0 | 0 | 0 | 5 | 0 |
| Viscosity (cps) | 445 | 920 | 500 | 800 | 1250 |

Compositions of the present invention having inert fillers, such as clay or starch, alcohol, surfactants and NaOH have increased degree of penetration into paper to which they are applied. The greater the penetration or "bite" the faster the tack time.

The replacement of dextrin in embodiment I of the present invention with an inert clay or starch according to embodiment II of the present invention resulted in excellent set times as shown in Table VI.

TABLE VI

| Sample | Tack time (minutes) |
|---|---|
| 100% starch replacement | 1.5 |
| 25% clay replacement | 3.3 |
| 50% clay replacement | 1.7 |

The addition of NaOH resulted in lower viscosities and better wetting. The NaOH provides a thinning effect through salvation. Since NaOH is also a swelling agent of fibers, it improves penetration into the substrate.

Wetting agents and alcohols also increased penetration and tack time.

It was also found that the inert clay enhances the shelf life of the adhesive compositions: the shelf life was found to be longer than one year.

Having described the invention with reference to its preferred embodiments, it is to be understood that modifications within the scope of the invention will be apparent to those skilled in the art.

What is claimed is:

1. An adhesive composition comprising of:
   (a) from about 0.05 to about 0.50% w/w of sodium metasilicate;
   (b) from about 0 to about 50% w/w of dextrin;
   (c) from about 3 to about 50% w/w of an inert clay or a starch;
   (d) from about 17 to about 70% w/w of an alkali metal silicate;
   (e) from about 0.05 to about 0.50% w/w of sodium metaborate octahydrate or sodium metaborate tetrahydrate;
   (f) from about 0.1 to about 10% w/w of 50% w/w sodium hydroxide or potassium hydroxide;
   (g) from about 0 to about 1% w/w of a wetting agent;
   (h) from about 0.1 to about 10% w/w of an alcohol or polyvinyl acetate;
   (i) from about 0.1 to about 30% w/w of a sugar; and
   (j) from about 15 to about 62% w/w of water.

2. The adhesive composition of claim 1 comprising:
(a) 0.20% w/w of sodium metasilicate;
(b) 10 to 20% w/w of dextrin;
(c) 10 to 20% w/w of kaolin or a starch;
(d) 40 to 60% w/w sodium silicate;
(e) 0.20% w/w sodium metaborate octahydrate;
(f) 1.0 to 2.0% w/w of 50% w/w sodium hydroxide or potassium hydroxide;
(g) 0.05 to 0.10% of a wetting agent;
(h) 3 to 5% w/w of an alcohol selected from the group consisting of methanol, ethanol and polyvinyl alcohol;
(i) 5 to 10% w/w of a sugar; and
(j) 15 to 21% w/w of water.

3. The adhesive composition of claim 1 wherein said alkali metal silicate is sodium silicate or potassium silicate.

4. The process of making an adhesive composition comprising the steps of:
(a) adding from about 0.05 to about 0.50% w/w of sodium metasilicate to about 15 to 62.0% w/w water, while vigorously stirring, to obtain a solution of the sodium metasilicate;
(b) adding, with continuous stirring, from about 0 to 50% w/w dextrin to obtain a solution of sodium metasilicate/dextrin;
(c) adding, with continuous stirring, from about 17 to about 70% w/w of an alkali metal silicate to obtain a solution of sodium metasilicate/dextrin/alkali metal silicate;
(d) adding, with continuous stirring, from about 0.05 to 0.50% w/w sodium metaborate octahydrate or sodium metaborate tetrahydrate;
(e) adding, with continuous stirring, from about 3 to about 50% w/w of an inert clay or starch to obtain a uniform blend thereof;
(f) heating the blend of ingredients at about 80° C. to 90° C. for a period of about 15 to 20 minutes;
(g) cooling the blend of ingredients to about 25° C.;
(h) adding, with stirring, 0.1 to 10% w/w of 50% w/w sodium hydroxide or potassium hydroxide;
(i) adding, with stirring, from about 0 to about 0.10% w/w of a wetting agent;
(j) adding, with stirring, from about 0.1 to about 10% w/w of an alcohol or polyvinyl acetate; and
(k) adding from about 0.1 to about 30% w/w of a sugar and stirring until a homogeneous blend or mixture is obtained.

5. The process of claim 4 wherein said alkali metal silicate is sodium silicate or potassium silicate.

6. The process of claim 4 wherein said dextrin is present in an amount of 10 to 23% w/w.

7. The process of claim 4 wherein said inert clay is present in an amount of from 10 to 23% w/w.

8. The process of claim 4 wherein said starch is present in an amount of from 10 to 23% w/w.

9. The process of claim 4 wherein said 50% w/w sodium hydroxide or potassium hydroxide is present in an amount of from 1 to 2% w/w.

10. The process of claim 4 wherein said alcohol is selected from the group consisting of methanol, ethanol and polyvinyl alcohol.

11. The process of making an adhesive composition comprising the steps of:
(a) adding from about 0.05 to about 0.50% w/w of sodium metasilicate to about 15 to 62.0% w/w water, while vigorously stirring, to obtain a solution of the sodium metasilicate;
(b) adding, with continuous stirring, from about 0 to 50% w/w dextrin to obtain a solution of sodium metasilicate/dextrin;
(c) adding, with continuous stirring, from about 17 to about 70% w/w of an alkali metal silicate to obtain a solution of sodium metasilicate/dextrin/alkali metal silicate;
(d) adding, with continuous stirring, from about 0.05 to 0.50% w/w sodium metaborate octahydrate or sodium metaborate tetrahydrate;
(e) adding, with continuous stirring, from about 3 to about 50% w/w of an inert clay or starch to obtain a uniform blend thereof;
(f) adding, with stirring, 0.1 to 10% w/w of 50% w/w sodium hydroxide or potassium hydroxide;
(g) adding, with stirring, from about 0 to about 0.10% w/w of a wetting agent;
(h) adding, with stirring, from about 0.1 to about 10% w/w of an alcohol or polyvinyl acetate; and
(i) adding from about 0.1 to about 30% w/w of a sugar and stirring until a homogeneous blend or mixture is obtained.

* * * * *